(12) United States Patent
Trentelman

(10) Patent No.: US 6,453,092 B1
(45) Date of Patent: Sep. 17, 2002

(54) TEMPERATURE COMPENSATED OPTICAL DEVICE

(75) Inventor: Jackson P. Trentelman, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/748,032

(22) Filed: Dec. 22, 2000

(51) Int. Cl.[7] .................................................. G02B 6/34
(52) U.S. Cl. ....................................................... 385/37
(58) Field of Search .............................. 385/31, 37–43, 385/147

(56) References Cited

U.S. PATENT DOCUMENTS

| | | | |
|---|---|---|---|
| 5,042,898 A | 8/1991 | Morey et al. ................. | 385/37 |
| 5,757,540 A | 5/1998 | Judkins et al. .............. | 359/341 |
| 5,914,972 A | 6/1999 | Siala et al. .................. | 372/33 |
| 5,991,483 A | 11/1999 | Engelberth .................... | 385/37 |
| 6,044,189 A | 3/2000 | Miller .......................... | 385/37 |
| 6,101,301 A | 8/2000 | Engelberth et al. ........... | 385/37 |

OTHER PUBLICATIONS

Paul R. Yoder, Jr., "Mounting Lenses in Optical Instruments", Tutorial Texts in Optical Engineering, vol. TT21, SPIE Optical Engineering Press.

*Primary Examiner*—Akm E. Ullah
(74) *Attorney, Agent, or Firm*—Eric M. Smith

(57) ABSTRACT

A package for temperature compensating a Bragg grating region of an optical waveguide fiber. The package includes a first tubular member having a low coefficient of thermal expansion attached to the optical fiber. A second tubular member, having a coefficient of thermal expansion greater than that of the first tubular member, is attached to the first tubular member. A third tubular member, having the same coefficient of thermal expansion as the first tubular member has one end attached to the optical waveguide fiber and the other end is attached to the second tubular member. The three tubular members are coaxial with one another and the Bragg grating region is encapsulated by the package.

14 Claims, 8 Drawing Sheets

TEMPERATURE COMPENSATED OPTICAL DEVICE

BACKGROUND OF THE INVENTION

1. Field of the Invention

The present invention relates generally to packages for optical waveguide fiber devices, and particularly to temperature-compensated optical devices.

2. Technical Background

One important consideration in optical communication systems is the ability of the optical communication system to operate reliably over a temperature range of about 0° C. to about 70° C. Reliability across this temperature range is difficult to achieve because the optical properties of many components used in optical communication systems vary with temperature.

Fiber Bragg gratings are widely used in optical communication systems. Fiber Bragg gratings are optical waveguide fiber devices that may be used to selectively reflect specific wavelengths of light propagating in an optical waveguide fiber. Fiber Bragg gratings consists of an array of shifts in the index of refraction along the path of light propagation in the optical fiber. The periodicity of the grating determines the wavelengths that are reflected by the fiber Bragg grating. A shift in the periodicity of the grating of 1 μm results in a shift in the reflected wavelength of 50 picometers.

Several approaches have been proposed to compensate for changes in ambient temperature. Many approaches are based upon placing the fiber Bragg grating in tension and then regulating the amount of tension to compensate for changes in the temperature of the fiber Bragg grating.

One specific approach to temperature compensation is to stake the fiber to a negative expansion substrate material, such as β-eucryptite. As the temperature increases, the substrate contracts thereby maintaining the reflective wavelength of the grating. This approach suffers from the fact that β-eucryptite material requires a hermetic packaging in order to function reliably over the range of environmental conditions specified for optical communication systems. This approach has proven to be difficult and costly. Furthermore, the overall size of the hermetically sealed negative expansion substrate package is large, in a relative sense. As optical communication systems develop the movement has been towards smaller packages and the placement of more components into the same or smaller volume.

Another approach uses materials of dissimilar thermal expansion characteristics to form a substrate to which the fiber is attached. Because of the differences in thermal expansion of the two dissimilar materials as temperature increases, the distance between the two attachment points of the fiber Bragg grating contracts. The amount of contraction depends on the choice of materials and the actual dimensions of the substrate. Any optical component package must pass stringent environmental and shock/vibration testing. The choice of material and the mass and size of a component are important considerations. For example, an optical component package having a large mass may require special additional packaging to stand vibration testing. Specialized packaging adds to the cost and size of the overall product.

For example, a tubular embodiment of such a package was presented in Applied Optics Volume 34, No. 30, Oct. 28, 1995. The article stated that the package must be a minimum of 40% longer than the grating itself. In this embodiment the fiber must be attached to each of the two dissimilar metals, possibly requiring two different attachment techniques. The assembly fold-over nature of the package, as it is presented, also precludes the simple attachment of the device to the fiber. The actual device disclosed in the article required an intermediate attachment to facilitate assembly. This intermediate attachment took the form of a threaded structure, which added cost and complexity to the package.

SUMMARY OF THE INVENTION

One aspect of the present invention is a package for temperature compensating a Bragg grating region of an optical waveguide fiber including a first tubular member attached to the optical waveguide fiber. The first tubular member is attached to the optical waveguide fiber and has a first coefficient of thermal expansion. The package further includes a second tubular member coupled to the first tubular member. The second tubular member has a coefficient of thermal expansion greater than the first coefficient of thermal expansion. The package also includes a third tubular member coupled to the second tubular member and to the optical waveguide fiber. The third tubular member has a coefficient of thermal expansion equal to the first coefficient of thermal expansion. The package encapsulates the Bragg grating region of the optical fiber.

In another aspect, the present invention includes a package for temperature compensating a fiber Bragg grating of an optical waveguide fiber including a first tubular member having a first coefficient of thermal expansion. The package further includes a second tubular member coupled to the first tubular member, the second tubular member having a second coefficient of thermal expansion. The package also includes a third tubular member coupled to the second tubular member, the third tubular member having a third coefficient of thermal expansion. The first tubular member, the second tubular member and the third tubular member define a cavity having a first end and a second end and the fiber Bragg grating is disposed within the cavity. The optical waveguide fiber is coupled to the first end and the second end.

In another aspect, the present invention includes a package for temperature compensating a fiber Bragg grating of an optical waveguide fiber including a first tubular member having a first coefficient of thermal expansion. The first tubular member includes a first end coupled to the optical waveguide fiber and a second end. The package further includes a second tubular member having a second coefficient of thermal expansion. The second tubular member includes a third end coupled to the second end and a fourth end. The package also includes a third tubular member having a third coefficient of thermal expansion. The third tubular member includes a fifth end coupled to the fourth end and a sixth end. The package also includes a cap, coupled to said optical waveguide fiber, engageable with the sixth end. The fiber Bragg grating is disposed between said first end and said cap and the first coefficient of thermal expansion and the third coefficient of thermal expansion are substantially the same.

In another aspect, the present invention includes a method for forming an optical waveguide device. The method includes the step of providing a first member having an inner wall and defining a first cavity having a first predetermined diameter. The method further includes the step of providing a second member having an inner wall defining a second cavity having a second predetermined diameter, wherein the second member is slidably engageable with the first cavity. The method further includes the step of inserting the second member into the first cavity. The method further includes the step of coupling the first member to the second member. The method also includes the step of providing a third member having an inner wall defining a third cavity having a third predetermined diameter, wherein said third member is slidably engageable with said cavity. The method further includes the step of inserting the third member into the second cavity and coupling the second member to the third member. The method further includes the step of providing an optical waveguide fiber of a second predetermined diameter less than the third predetermined diameter. The method further includes the step of inserting said optical waveguide fiber into said third cavity. The method also includes the steps of coupling said optical waveguide fiber to said first member; and coupling said optical waveguide fiber to said third member.

One advantage of the present invention is that it allows for a reduction in size over typical temperature compensated fiber Bragg grating packages.

Another advantage of the present invention is that only a single method is required to attach the optical waveguide fiber to the package at two spaced apart locations.

Another advantage of the present invention is that it is less complicated than currently known methods of temperature compensating optical fiber devices.

Another advantage of the present invention is that the relative lack of complexity of the individual elements that are incorporated into different embodiments of the invention have the potential to significantly lower the cost of manufacture compared to currently known methods.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE PREFERRED EMBODIMENTS

Figure 1:
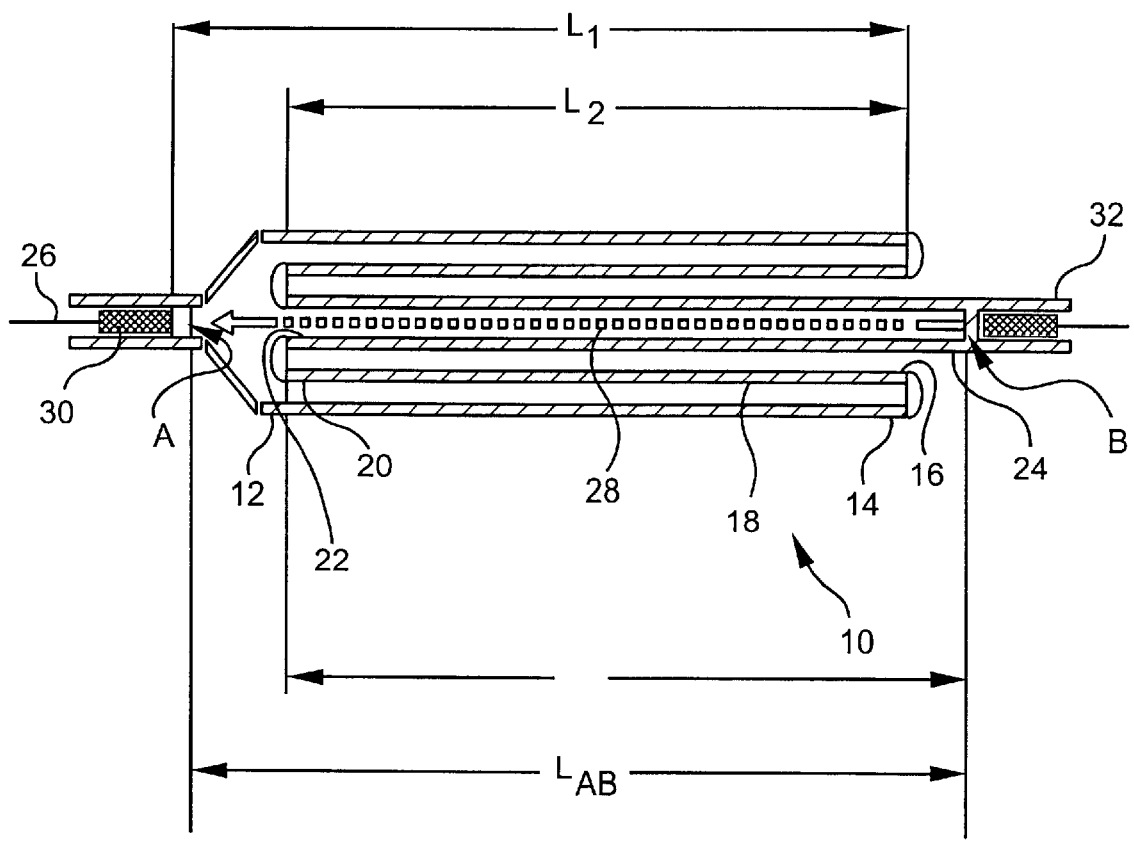
FIG. 1 is a cross-sectional view of a temperature-compensated optical device according to an embodiment of the present invention.

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of the temperature-compensated optical device of the present invention is shown in FIG. 1, and is designated generally throughout by reference numeral 10.

In accordance with the invention, the present invention for a temperature compensated fiber Bragg grating 10 includes a first tubular member 12. One end 14 of the first tubular member 12 is coupled to one end 16 of a second tubular member 18. The end 14 of the first tubular member 12 may be coupled to the end 16 of the second tubular member 18 by adhesive bonding, brazing, soldering or welding.

The other end 20 of the second tubular member 18 is coupled to one end 22 of a third tubular member 24. The end 20 of the second tubular member 18 may be coupled to the end 22 of the third tubular member 24 by adhesive bonding, brazing, soldering or welding.

An optical waveguide fiber 26 having fiber Bragg grating region 28 is coupled to the end 30 of the first tubular member 12 at point A and to the end 32 of the third tubular member 24 at point B. Preferably, the fiber Bragg grating region 28 is tensioned so that the fiber Bragg grating region 28 reflects optical signals having a selected waveband. Tensioning the fiber Bragg grating region 28 changes the periodicity of the grating, thus enabling the center wavelength of the reflected waveband to be modified. The fiber Bragg grating region 28 of the optical waveguide fiber 26 is located between point A and point B. The optical waveguide fiber 26 may be coupled to the end 30 of the first tubular member 12 and the end 32 of the third tubular member 24 by any one of a number of different coupling mechanisms. For example, glass frits may be used to secure the optical waveguide fiber 26 to the first 12 and third 24 tubular members at points A and B respectively. Alternatively, the optical waveguide fiber 26 could be metallized and soldered to the first 12 and third 24 tubular members at points A and B respectively. Reference is made to U.S. Pat. No. 5,970,194, which is incorporated herein by reference as though set forth in its entirety, for a more detailed explanation of metallizing glass optical fibers. As a further example, the optical waveguide fiber 26 could be adhesively bonded to the first 12 and third 24 tubular members at points A and B respectively. An example of an adhesive that has proven suitable is EP 62-1 available from Master Bond, Inc. of Hackensack, N.J., U.S.A.

If the optical waveguide fiber 26 is coupled to the first 12 and third 24 tubular members using an adhesive, the adhesive bonds should be in the range from about 1 mm to about 3 mm in length.

Preferably, the first tubular member 12 and the third tubular member 24 are made of materials having the same coefficient of thermal expansion (CTE) and the coefficients of thermal expansion of the first tubular member 12 and the third tubular member 24 are less than the coefficient of thermal expansion for the second tubular member 18.

The effective coefficient of thermal expansion for the temperature-compensated optical device 10 having very thin bond lines is given by equation 1.

$$\alpha_{eff} = \frac{-\alpha_2 \cdot l_2 - \alpha_1 \cdot l_1 - \alpha_3 \cdot l_3}{l_{AB}} \quad (1)$$

where, $\alpha_{eff}$=effective coefficient of thermal expansion;
$l_{AB}$=distance between point A and point B;
$\alpha_1$=coefficient of thermal expansion of the first tubular member;
$\alpha_2$=coefficient of thermal expansion of the second tubular member;
$\alpha_3$=coefficient of thermal expansion of the third tubular member;
$l_1$=distance from point A to the end 14 of the first tubular member 12;
$l_2$=length of the second tubular member 18; and
$l_3$=distance from point B to the end 22 of the third tubular member 24.

For at least one type of fiber Bragg grating in a silica based optical waveguide fiber it is desirable for the temperature-compensated optical device 10 to have a coefficient of thermal expansion of $-75-10^{-7}$ per °C. The length of a Fiber Bragg grating typically used in optical communication systems is about 13 mm.

When $l_1$ and $l_3$ are equal and the first tubular member 12 and the third tubular member 24 have the same coefficient of thermal expansion, equation (1) may be rewritten as equation (2).

$$\alpha_{eff} = \frac{-\alpha_2 \cdot l_2 - 2 \cdot \alpha_1 \cdot l_1}{l_{AB}} \quad (2)$$

where, $\alpha_{eff}$=effective coefficient of thermal expansion;
$l_{AB}$=distance between point A and point B;
$\alpha_1$=coefficient of thermal expansion of the first and third tubular members;
$\alpha_2$=coefficient of thermal expansion of the second tubular member;
$l_1$=distance from point A to the end 14 of the first tubular member 12; and
$l_2$=length of the second tubular member 18.

One embodiment of the present invention, for example, includes a second tubular member 18 made of American Iron and Steel Institute (AISI) 304 stainless steel and first and third tubular members 12, 24 made of INVAR®. Over the temperature range of interest in optical communication system applications AISI 304 stainless steel has an average coefficient of thermal expansion of $150 \times 10^{-7}$ per °C. and INVAR® has an average coefficient of thermal expansion of $15 \times 10^{-7}$ per °C. When $l_{AB}$ is equal to 42 mm, $l_1$ and $l_3$ are equal to 35 mm and $l_2$ is equal to 28 mm, the temperature-compensated optical device 10 has an effective coefficient of thermal expansion of $-75 \times 10^{-7}$ per °C.

Figure 2:
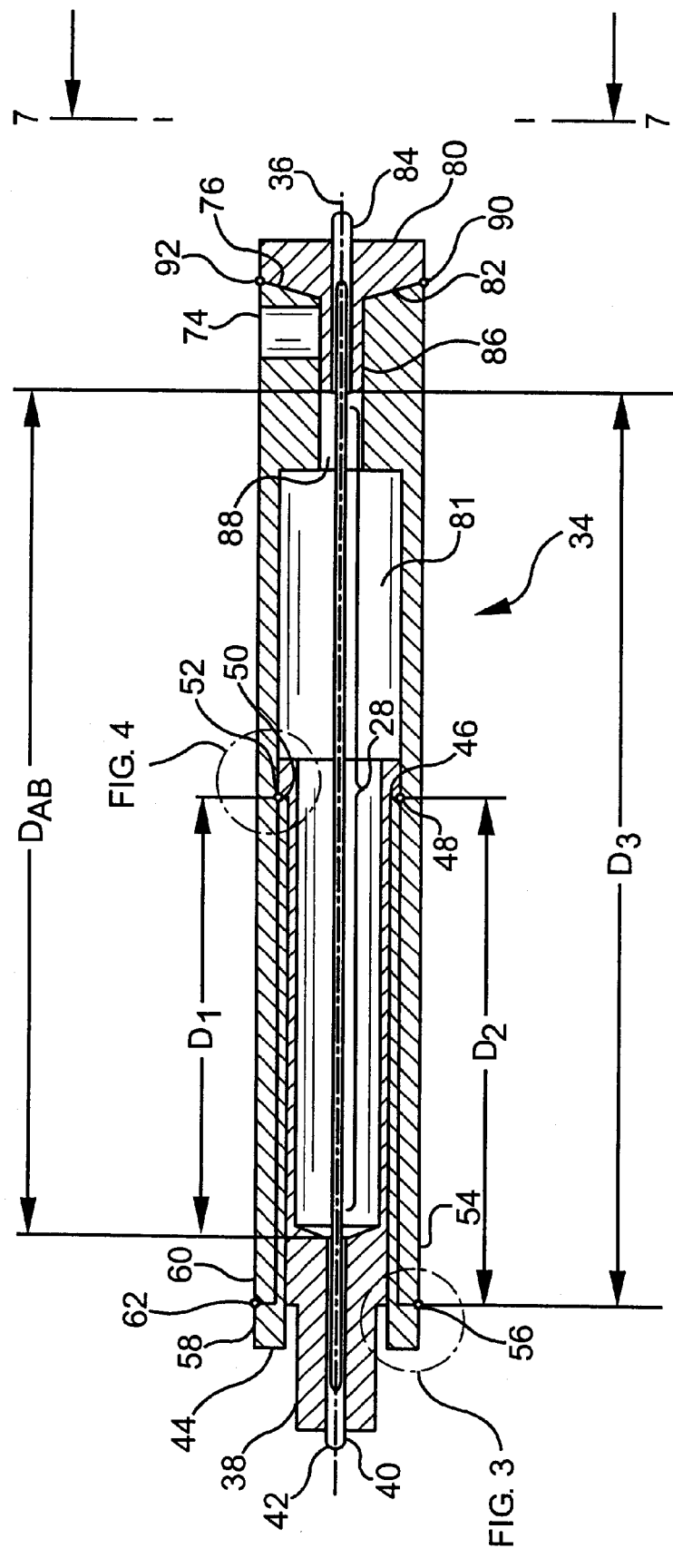
FIG. 2 is a cross-sectional view of a temperature-compensated optical device according to an alternative embodiment of the present invention.

Another embodiment of the temperature-compensated optical device of the present invention is shown in FIG. 2, and is designated generally throughout by reference numeral 34. The temperature-compensated optical device 34 has a longitudinal axis 36. Preferably the temperature-compensated optical device 34 is symmetric about the longitudinal axis 36 and the fiber Bragg grating region 28 is disposed to be coincident with the longitudinal axis 36. The temperature-compensated optical device 34 includes an inner member 38. The inner member 38 has an opening 40 for the fiber 42 to pass through. The opening 40 should be slightly larger than the diameter of the optical fiber 42. For an optical fiber 42 that is a 125 μm glass fiber with a polymer coating, such as for example, SMF-28™ optical waveguide fiber, available from Corning Incorporated of Corning, N.Y., the opening may be a circular hole having a diameter of about 0.011 inch. The optical fiber 42 will be coupled to the inner member 38 using the opening 40. Preferably the opening 40 is sized to allow good mechanical attachment of the fiber 42 to the inner member 38. The dimensions of the opening 40 depend upon the attachment mechanism used. Examples of attachment mechanisms include using adhesives, glass frits and solder to attach the fiber 42 to the inner member 38. For example, when an adhesive is used to attach the fiber 42 to the inner member 38, the opening 40 is a circular hole having a diameter of about 0.011 inch. Examples of adhesives that may be used include EP 62-1 available from Master Bond, Inc. of Hackensack, N.J., U.S.A.

The temperature-compensated optical device 34 also includes a middle member 44. The middle member 44 is coupled to the inner member 38 at a predetermined location 46. The predetermined location 46 is a distance $d_1$ from where the fiber 42 is attached to the inner member 38. For example, in FIG. 2 one end 48 of the inner member 38 is coupled to an end 50 of the middle member 44 by a series of welds 52. The welds 52 may be made using a laser. The inner member 38 may also be coupled to the middle member 44 by adhesive bonding, brazing, mechanical connection, soldering, or other types of welding. Mechanical connection may include, for example, forming complementary threaded portions on the inner and middle members 38, 44.

The middle member 44 is coupled to an outer member 54. The middle member 44 is coupled to the outer member 54 at predetermined location 56. The predetermined location 56 is a distance $d_2$ from the location 46 where the inner member 38 is coupled to the middle member 44. For example, in FIG. 2 one end 58 of the middle member 44 is coupled to an end 60 of the outer member 54 by a series of welds 62. The welds 62 may be made using a laser. The inner member 38 may also be coupled to the middle member 44 by adhesive bonding, brazing, mechanical connection, soldering, or other types of welding. Mechanical connection may include, for example, forming complementary threaded portions on the inner and middle members 38, 44, riveting the inner and middle members 38, 44 together, and using pins to couple the inner member 38 to the middle member 44.

Figure 3:
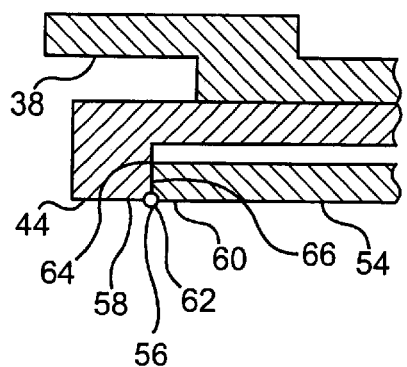
FIG. 3 is an enlarged fragmentary view of the portion of the temperature-compensated optical device within the sight circle 3—3 of FIG. 2.

FIG. 3 is illustrative of one method of locating the outer member 54 longitudinally with respect to the middle member 44. The outer member 54 is configured to be slidably engageable with the middle member 44. One end 58 of the middle member 44 has a reference surface 64. One end 60 of the outer member 54 has a surface 66 configured for registering against the reference surface 64. For example, if the reference surface 64 is perpendicular to the longitudinal axis 36 (as shown in FIG. 2) of the temperature-compensated optical device 34 and the middle member 44 is to be welded to the outer member 54 the surface 66 may also be perpendicular to the longitudinal axis 36 of the temperature-compensated optical device 34.

Figure 4:
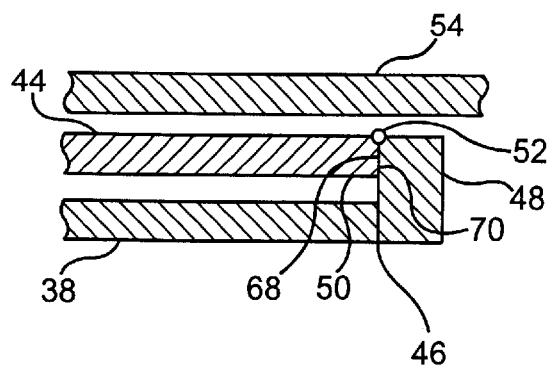
FIG. 4 is an enlarged fragmentary view of the portion of the temperature-compensated optical device within the sight circle 4—4 of FIG. 2.

FIG. 4 is illustrative of one method of locating the inner member 38 longitudinally with respect to the middle member 44. The end 50 of middle member 44 includes a reference surface 68. The inner member 38 is configured to be slidably engageable with the middle member 44. The end 48 of the inner member 38 has a surface 70 configured for registering against the reference surface 68. For example, if the reference surface 68 is perpendicular to the longitudinal axis 36 (as shown in FIG. 2) of the temperature-compensated optical device 34 and the middle member 44 is to be welded to the inner member 38 the surface 70 may also be perpendicular to the longitudinal axis 36 of the temperature-compensated optical device 34. In the embodiment shown in FIG. 4, a series of welds 52 couple the inner member 38 to the middle member 44.

It will be apparent to those of ordinary skill in the pertinent art that modifications and variations can be made in configuring the inner member 38, the middle member 44 and the outer member 54 for connection to one another. Furthermore, it will be apparent to those of ordinary skill in the art that other materials, lengths, diameters and wall thicknesses may be selected depending upon the size and thermo-optic properties of the fiber Bragg grating being temperature compensated.

Figure 5:
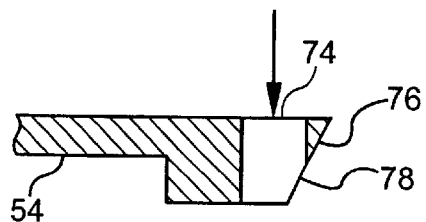
FIG. 5 is an enlarged fragmentary view of the portion of the temperature-compensated optical device within the sight circle 5—5 of FIG. 2.

Returning to FIG. 2, the outer member 54 includes a conical surface 76 having an axis of symmetry coincident with the longitudinal axis 36 of the temperature-compensated optical device 34. The outer member 54 also includes a threaded hole 74. The threaded hole is configured to receive a threaded rod (not shown), for example a bolt or screw. As shown in FIG. 5, the threaded hole 74 is disposed proximate to the conical surface 76 such that there is a region 78 of the conical surface 76 in which intersects the threaded hole 74.

Figure 6:
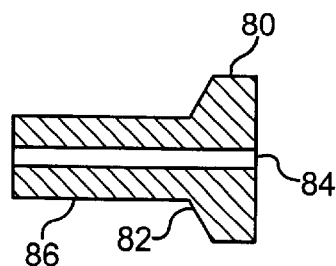
FIG. 6 is a cross-section view of an embodiment of an end cap.

Returning to FIG. 2, the temperature-compensated optical device 34 also includes an end cap 80. Preferably the end cap 80 is made of a material having the same coefficient of thermal expansion as the outer member 54. FIG. 6 is illustrative of on embodiment of the end cap 80. The end cap 80 has a conical surface 82 configured to engage the conical surface 76 of the outer member 54. The end cap 80 also includes a through hole 84. The hole 84 is sized to allow the optical fiber 42 to pass through it and to provide a bonding surface the optical fiber 42 may be attached to. When the optical fiber 42 has a diameter of 125 μm and is coupled to the end cap 80 by adhesive bonding the hole 84 will typically have a diameter of about 0.011 inch. A hole diameter of 0.011 inch provides clearance for a typical coated 125 μm fiber to pass through the hole while minimizing the thickness of the adhesive used to couple the optical fiber 42 to the end cap 80. It will be apparent to those of ordinary skill in the art that modifications and variations in the diameter of the hole 84 may be made to accommodate optical waveguide fibers of different dimensions and other attachment mechanisms for coupling the optical waveguide fiber 42 to the end cap 80. For example, coupling the optical waveguide fiber 42 to the end cap 80 with a glass frit or by metallizing and soldering the optical waveguide fiber 42 to the end cap may require a larger diameter hole.

The end cap 80 also includes a section 86 that is configured to engage an opening 88 in the outer member 54. The opening 88 is axisymmetric about the longitudinal axis 36 of the temperature-compensated optical device 34. The section 86 guides the end cap 80 so that the hole 84 is substantially coincident with the longitudinal axis 36 of the temperature-compensated optical device 34.

Figure 7:
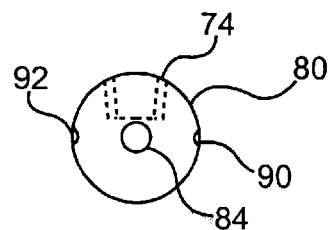
FIG. 7 is an end elevation view of the temperature-compensated optical device shown in FIG. 2.

In one embodiment of the invention the end cap 80 is coupled to the outer member 54 by welding, for example by laser welding. Turning to FIG. 7 for clarity two welds 90, 92 secure the end cap 80 to the outer member 54. Preferably, the welds 90, 92 are opposite one another on the perimeter of the temperature-compensated optical device and are disposed so that a line connecting the two welds 90, 92 is approximately perpendicular to the axis of the threaded hole 74.

Typically, the temperature-compensated optical device 34 will be assembled by coupling the inner member 38, middle member 44, outer member 54 and the end cap 80 to one another as described above. The optical fiber 42 is then inserted into this assembly so that the fiber Bragg grating region is located within the interior cavity 81 of the temperature-compensated optical device 34. The fiber Bragg grating region 28 is tensioned to a pre-selected value corresponding to a specific operating center wavelength. The optical fiber 42 is then coupled to the inner member 38 and the end cap 80, so that the fiber Bragg grating region 28 is suspended in the interior cavity 110 and is not directly coupled to either the inner member 38 of the end cap 80.

The center wavelength of the fiber Bragg grating region 28 may be adjusted by inserting a threaded member (not shown), for example a bolt, screw, set screw or threaded rod into the threaded hole 74. As the threaded member moves in the direction indicated by the arrow in FIG. 5, the major diameter of the threads will protrude through the conical surface 76 in the region 78 thus contacting the conical surface 82 of the end cap 80. As the engagement of the threaded member with the threaded hole 74 increase more force is exerted on the end cap 80. Because the end cap 80 is substantially constrained by the interaction of the section 86 of the end cap 80 engaged with the opening 88 to movement along the longitudinal axis of the temperature-compensated optical device 34 the tensile strain in the fiber Bragg grating region 28 is increased. This increase in the strain of the fiber Bragg grating region 28 allows the operating waveband of the fiber Bragg grating region 28 to be tuned in one direction.

It will be apparent to those of ordinary skill in the pertinent art that modifications and variations can be made to the inner member 38, the middle member 44 and the outer member 54 of the present invention depending on design constraints. For example, the inner member 38, the middle member 44 and the outer member 54 may be rectangular, hexagonal, octagonal or triangular in cross section rather than the circular cross section used as an example throughout the detailed descriptions presented above.

The effective coefficient of thermal expansion $\alpha_{\mathit{eff}}$ of the temperature-compensating package 34.

It will be further apparent to those of ordinary skill in the pertinent art that modifications and variations can be made to the inner member 38, the middle member 44 and the outer member 54 of the present invention, for example, the inner member 38, the middle member 44 and the outer member 54 may be made from ceramic or composite materials.

The temperature-compensating package 34 of the present invention offers the advantage that is may be assembled before being joined to the optical fiber device.

Figure 8:
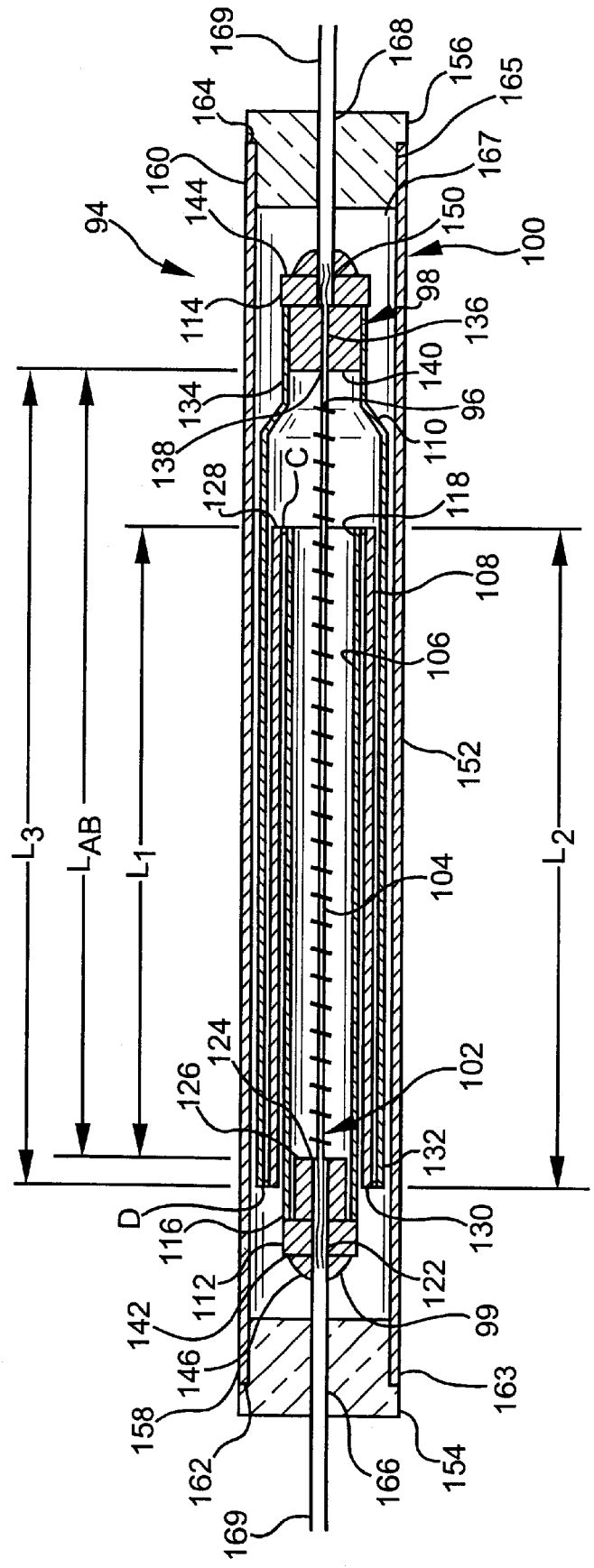
FIGS. 8 is a cross-sectional view of a temperature-compensated optical device according to an alternative embodiment of the present invention.

An alternative embodiment of the temperature-compensated optical device of the present invention is shown in FIG. 8, and is designated generally throughout by reference numeral 94.

As embodied herein, and depicted in FIG. 8, the temperature-compensated optical device 94 includes a optical fiber device 96, a temperature-compensating package 98 and an over-package 100. The optical fiber device 96 is made from an optical fiber having a protective coating. The protective coating is typically a polymer, however, as will be appreciated by those skilled in the art of making optical fiber devices other coatings, such as, for example, metallic coatings are sometimes used. The optical fiber device 96 includes a stripped region 102 from which the protective coating is removed. The stripped region 102 includes a grating 104, such as, for example, a Bragg grating or a long period grating.

The temperature-compensating package 98 includes an inner member 106, a middle member 108, an outer member 110, and two caps 112, 114. The inner member 106 may be an axisymmetric longitudinal body. The inner member 106 includes two ends 116, 118. The inner member 106 is made from a material having a coefficient of thermal expansion that is less than the coefficient of thermal expansion of the middle member 108. Preferably the inner member 106 is made from a low thermal expansion material, such as, for example, Invar®, Kovar® or Alloy 42. The inner member 106 may be made using any one of or a combination of methods known to those skilled in the art of fabricating metallic components, such as, for example, machining, stamping or turning on a mandrel.

One cap 112 is configured for engagement with an end 116 of the inner member 106. The end cap 112 includes a through hole 122. The through hole 122 is positioned so that when the end cap 112 is coupled to the end 116 of the inner member, such as, for example, by adhesive bonding, the axis of the through hole in coincident with the longitudinal axis of the inner member 106. The through hole 122 is typically a round hole sized to allow the end cap 112 to be threaded onto an optical fiber 96, such as, for example an SMF-28™ optical waveguide fiber, available from Corning Incorporated of Corning, N.Y., and then to be adhesively bonded to the optical fiber 96. Preferably, the diameter of the through hole 122 is about 0.011 inch when the optical fiber 96 has a diameter of about 125 $\mu$m. This diameter allows the adhesive, such as, for example, EP 62-1 available from Master Bond, Inc. of Hackensack, N.J., U.S.A. to have as thin a bond line while still holding the optical fiber 96 securely in position. A thin bond line is advantageous because it is more resistant than a thick bond line to the diffusion of water through the adhesive. Preferably, the through hole 122 forms a sharp edge 124 with the surface 126 of the end cap 112.

The end cap 112 may be coupled to the inner member 106, such as, for example, by adhesive bonding, brazing, soldering or welding.

The middle member 108 includes two ends 128, 130 and may be an axisymmetric longitudinal body. The middle member 108 is made from a material having a coefficient of thermal expansion greater than the coefficients of thermal expansion of the inner member 106 and the outer member 110. Preferably, the middle member 108 is made from a high thermal expansion material, such as, for example a American Iron and Steel Institute (AISI) 300 series stainless steel, a specific example of which is AISI 309 stainless steel, designated as S30900 under the Unified Number System. The middle member 108 may be made using any one of or a combination of methods known to those skilled in the art of fabricating metallic components, such as, for example, machining, stamping or turning on a mandrel.

The outer member 110 has two ends 132, 134 and may be an axisymmetric longitudinal member, such as, for example, a tubular member. Preferably the outer member 110 is made from a low thermal expansion material, such as, for example, Invar®, Kovar® or Alloy 42. The outer member 110 may be made using any one of or a combination of methods known to those skilled in the art of fabricating metallic components, such as, for example, machining, stamping or turning on a mandrel. The outer member 110 is configured to fit over the middle member 108 so that one end 132 may be coupled to an end 130 of the middle member 108. The outer member 110 may be coupled to the middle member 108 by adhesive bonding, brazing, soldering, or welding. Preferably the method of coupling the outer member 110 to the middle member 108 does not result in a hermetic seal, an example of a coupling means that securely couples the outer member 110 to the middle member 108 without forming a hermetic or near hermetic seal is spot welding using a laser. Coupling the outer member 110 to the middle member 108 by laser spot welding offers the additional advantage that the locations of the welds may be precisely controlled.

The other end 134 of the outer member 110 is configured to receive an end cap 114. The end cap 114 may be identical to the end cap 112 used on the end 116 of the inner member 106. When the outer member 110 is a cylindrical, such as, for example as shown in FIG. 8, the inner diameter of the end 134 may be reduced so that it is substantially the same is the inner diameter of the inner member 106. This allows both of the end caps 112, 114 to be identical. In any case, the end cap 114 includes a through hole 136. The through hole 136 is located in the end cap 114 so that when the end cap 114 is coupled to the end 134 of the outer member 110 it is substantially aligned with the hole 122 in the end cap 112. The through hole 136 is typically a round hole sized to allow the end cap 114 to be threaded onto an optical fiber 96, such as, for example an SMF-28™ optical waveguide fiber, available from Corning Incorporated or Corning, N.Y., and then to be adhesively bonded to the optical fiber 96. Preferably, the diameter of the through hole 136 is about 0.011 inch when the optical fiber 96 has a diameter of about 125 $\mu$m. This diameter allows the adhesive, such as, for example, EP 62-1 available from Master Bond, Inc. of Hackensack, N.J., U.S.A. to have as thin a bond line while still holding the optical fiber 96 securely in position. A thin bond line is advantageous because it is more resistant than a thick bond line to the diffusion of water through the adhesive. Preferably, the through hole 136 forms a sharp edge 138 with the surface 140 of the end cap 114.

The temperature-compensating package 98 may be assembled before threading it onto an optical fiber device 96. Alternatively, the inner member 106, middle member 108 and outer member 110 may be coupled to one another as described above and threaded onto the optical fiber device 96 separately from the end caps 112, 114.

The temperature-compensating package 98 is positioned on the optical fiber device 96 so that it is substantially centered on the stripped portion 102. Preferably, the grating 104 is centered between the two surfaces 126, 140 of the end caps 112, 114. Typically, the stripped portion will extend about 0.5 mm beyond the end surfaces 142, 144 of the end caps 112, 114. The optical fiber device 96 is tensioned, such as, for example by applying a tensile stress of about 580 psi to the optical fiber device 96, however, as will be appreciated by those skilled in the art of packaging grating, the amount of tension applied to the optical fiber device 96 depends upon the desired center wavelength of the grating 104 after assembly.

The optical fiber device 96 and the temperature-compensating package 98 are isothermally heated to between about 115° C. and about 135° C., preferably to about 130° C. Approximately 1 mm³ of an adhesive, such as, for example, EP 62-1 available from Master Bond, Inc. of Hackensack, N.J., U.S.A. is applied to the point 99 where the optical fiber device 96 extends from the temperature-compensating package 98. The adhesive is drawn into the hole 122 by capillary action filling the volume around the optical fiber device 96. As long as there is enough adhesive to fill the entire volume about the optical fiber device 96 and the edge 124 is sufficiently well defined, the surface tension of the adhesive will prevent it from flowing past the surface 126 of the end cap 112. The adhesive is then allowed to cure for about 1 to about 5 minutes, depending on the temperature and the specific adhesive used. After the adhesive coupling the optical fiber device 96 to the sides of the hole 122 has cured an additional amount of adhesive is applied to the stripped portion 102 of the optical fiber device 96 extending past the surface 142 of the end cap 112. This additional adhesive is formed into a strain relief boot 146 and is then allowed to cure.

Similarly, about 1 mm³ of adhesive, such as, for example, EP 62-1 available from Master Bond, Inc. of Hackensack, N.J., U.S.A. is applied to the point 148 where the optical fiber device 96 extends from the temperature-compensating package 98. The adhesive is drawn into the hole 136 by capillary action filling the volume around the optical fiber device 96. As long as there is enough adhesive to fill the entire volume about the optical fiber device 96 and the edge 138 is sufficiently well defined, the surface tension of the adhesive will prevent it from flowing past the surface 140 of the end cap 114. The adhesive is then allowed to cure for about 1 to about 5 minutes, depending on the temperature and the specific adhesive used. After the adhesive coupling the optical fiber device 96 to the sides of the hole 136 has cured an additional amount of adhesive is applied to the stripped portion 102 of the optical fiber device 96 extending past the surface 144 of the end cap 114. This additional adhesive is formed into a strain relief boot 150 and is then allowed to cure. After the adhesive has cured the assembly is cooled to room temperature.

The effective coefficient of thermal expansion of the temperature-compensating package 98 may be calculated according to equation 1. The distance $l_{AB}$, which defines the effective length of the temperature-compensating package 98 is the distance between the surfaces 126, 140 of the end caps 112, 114. The distance $l_1$ is the lineal distance from the surface 126 of the end cap 112 to the point C where the end 118 of the inner member 106 is coupled to the end 128 of the middle member 108. The distance $l_2$ is the lineal distance from point C to the point D where the end 130 of the middle member 108 is coupled to the end 132 of the outer member 110. The distance $l_3$ is the lineal distance between point D and the surface 852 of the end cap 114.

In one example, the inner member 106 and the outer member 110 are made from INVAR® having a coefficient of thermal expansion of $15 \times 10^{-7}$ per ° C. over the temperature range of interest in optical communication system applications. The middle member is made from AISI 304 stainless steel having a coefficient of thermal expansion of $150 \times 10^{-7}$ per ° C. over the temperature range of interest in optical communication system applications. The distances of interest in the example are: $L_{AB}$ is equal to 42 mm, $l_1$ is equal to 35 mm, $l_2$ is equal to 28 mm and $l_3$ is equal to 35 mm. This selection of materials and dimensions results in a temperature-compensating package 98 with an effective coefficient of thermal expansion of $-75 \times 10^{-7}$ per ° C. The over-package 100 includes a sleeve 152 and two end caps 154, 156. The sleeve 152 may be made from a stainless steel, such as, for example, an American Iron and Steel Institute (AISI) 300 series stainless steel, a specific example of which is AISI 304 stainless steel, designated as S30400 under the Unified Number System. The sleeve 152 may be a tube, such as, for example a tube having an outside diameter of about 4 mm and a wall thickness of about 0.008 inch.

The end caps 154, 156 are configured to engage the ends 158, 160 of the sleeve 152. The end caps 154, 156 may be in the form of a cylinder having a shoulder 162, 164 to bank against the ends 158, 160 of the sleeve 152. Typically, the diameter of the regions 163, 165 of the end caps 154, 156 that fit inside the sleeve 152 are about 0.002 inch less than the inside diameter of the sleeve 152. The sleeve 152 and end caps 154, 156 are threaded onto the optical fiber device 96. The sleeve 152 is preferably centered over the temperature-compensating package 98 and then the end caps 154, 156 are coupled to the sleeve 152 and the optical fiber device 96 thereby forming a hermetic or near-hermetic cavity 167.

The end caps 154, 156 are coupled to the sleeve 152 by heating the sleeve 152, end caps 154, 156, optical fiber device 96 and the temperature-compensating package 98 to about 130° C. The end caps 154, 156 are inserted into the ends 158, 160 of the sleeve 152. An adhesive, such as, for example, EP 62-1 available from Master Bond, Inc. of Hackensack, N.J., U.S.A. is applied to the interface of the shoulders 162, 164 and the sleeve 152 ends 158, 160. The adhesive is drawn into the space between the inside diameter of the sleeve 152 and the end caps 154, 156. Careful selection of the adhesive and the dimensions of the end caps 154, 156 and the sleeve 152 inside diameter will result in a hermetic or near hermetic seal between the end caps 154, 156 and the sleeve 152 when the adhesive has cured.

It will be apparent to those of ordinary skill in the art of forming hermetic or near-hermetic seals that modifications and variations can be made to the means of coupling the end caps 154, 156 to the sleeve 152. For example, the sleeve 152 can be coupled to the end caps 154, 156 brazing, soldering or welding.

Each of the end caps 154, 156 includes a through hole 166, 168. The diameter of the through holes 166, 168 are such as to allow the end caps 154, 156 to be threaded on to the optical fiber device 96 and allow the end caps 154, 156 to be coupled to the optical fiber device 96 thus forming a hermetic or near hermetic seal. Preferably, the diameter of the through holes 166, 168 is about 0.011 inch when the optical fiber device 96 has a diameter of about 125 µm exclusive of the coating.

The sleeve 152 with the end caps 154, 156 coupled to it is positioned so that the temperature-compensating package 98 is substantially centered within the cavity 167. The optical fiber device 96 is tensioned the same amount used when coupling the temperature-compensating package 98 to the optical fiber device 96. Adhesive, such as, for example EP 62-1 available from Master Bond, Inc. of Hackensack, N.J., U.S.A. is applied to the holes 166, 168 and fills the space between the coated portions 169 of the optical fiber device 96 and the sides of the holes 166, 168 by capillary action thereby forming hermetic or near-hermetic seals. The temperature-compensated optical device 94 must be in an isothermal condition when the final hole is filled with adhesive. After the adhesive is cured the tension is removed from the optical fiber device 96 and the completed temperature-compensated optical device 94 is allowed to cool to room temperature. The center wavelength of the grating 104 when the completed temperature-compensated optical device 94 is at room temperature is determined by the tension applied to the optical fiber device 96 during the assembly process, the temperature during the assembly process and the thermal response of the complete assembly as it cools.

It will be apparent to those of ordinary skill in the art of packaging optical fiber devices that modifications and variations can be made to the means of coupling the end caps 154, 156 to the optical fiber device 96. For example, the optical fiber device 96 can be coupled to the end caps 154, 156 by metallizing the optical fiber device 96 and soldering it to the end caps 154, 156 or by using glass frits.

It will be apparent to those of ordinary skill in the art of packaging optical fiber devices that devices that modifications and variations can be made to the end caps 154, 156 to the sleeve 152. For example, the sleeve 152 and the end caps 154, 156 can be made from ceramic, glass-ceramic or glass and coupled to one another and the optical fiber device 96 to form a hermetic or near-hermetic cavity 167 using techniques known to those skilled in the pertinent art, such as, for example, adhesive bonding, glass frits, metallizing and soldering surfaces together and fusing surfaces to one another using concentrated heat.

$$\alpha_{eff} = \frac{-\alpha_2 \cdot l_2 - \alpha_1 \cdot l_1 - \alpha_3 \cdot l_3}{l_{AB}} \quad (1)$$

where, $\alpha_{eff}$=effective coefficient of thermal expansion;

$\alpha_1$=coefficient of thermal expansion of the first tubular member;

$\alpha_2$=coefficient of thermal expansion of the second tubular member;

$\alpha_3$=coefficient of thermal expansion of the third tubular member; and $l_1, l_2, l_3, l_{AB}$ are as shown in FIG. 8.

Figure 9:
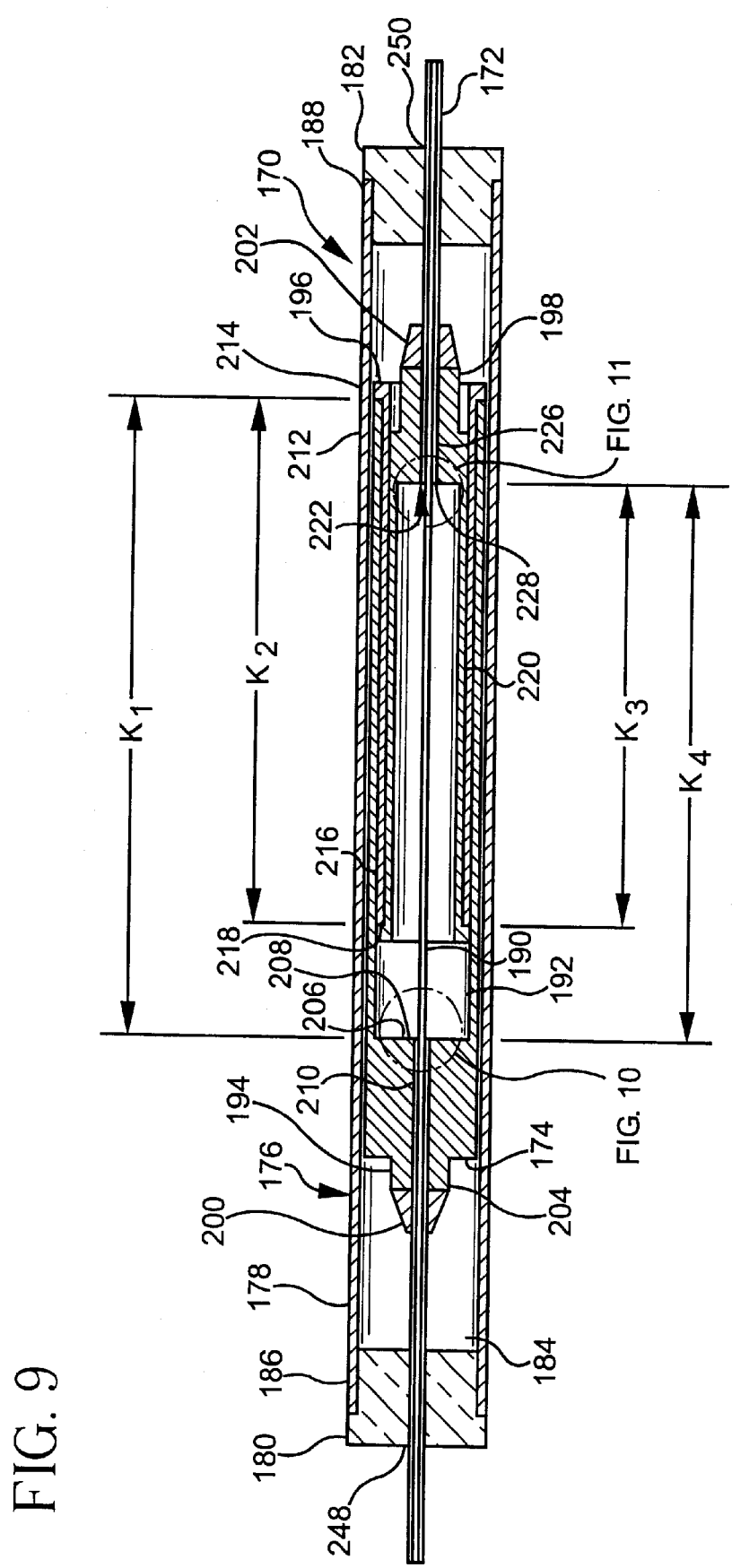
FIG. 9 is a cross-sectional view of a temperature-compensated optical device according to an alternative embodiment of the present invention.
Figure 10:
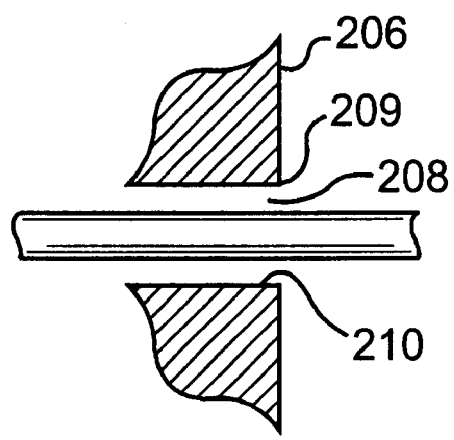
FIG. 10 is an enlarged fragmentary view of the portion of the temperature-compensated optical device within the sight circle 10—10 of FIG. 9.

FIG. 9 shows an alternative embodiment in which the temperature-compensated optical device 170 of the present invention includes an optical fiber device 172, a temperature-compensating package 174 and an over-package 176. The temperature-compensating package 174 is encapsulated by the over-package 176.

The over-package 176 includes a sleeve 178 and two end caps 180, 182. The sleeve 178 and the two end caps 180, 182 together define a cavity 184. The temperature-compensating package 174 is contained within the cavity 184. The sleeve 178 and the two end caps 180, 182 are configured and coupled together to from a hermetic or near-hermetic barrier isolating the cavity 184 from ambient atmospheric conditions. The sleeve 178 may be of any shape, such as, for example, circular, polygonal, rectangular, or triangular. The sleeve 178 may be made from any material, such as, for example, ceramic, glass, metal or a polymer that is impermeable to water vapor and provides for a robust package that satisfies predetermined shock and vibration specifications. A specific example of a metal from which the sleeve 178 may be made is AISI 304 stainless steel.

Each of the end caps is configured to engage an end 186, 188 of the sleeve 178. The end caps 180, 182 may be made from ceramic, glass, metal or a polymer. A specific example of a metal from which the sleeve 178 may be made is AISI 304 stainless steel. The end caps 180 182 may be coupled to the respective ends 186, 188 of the sleeve 178 by adhesive bonding, brazing, soldering or welding. Alternatively, the end caps 180, 182 may be molded in place, out of a suitable material, such as, for example, a polymeric material that is impermeable to contaminating gases and liquids, such as, for example water or water vapor.

The optical fiber device 172 includes an optical device region 190 that it is desirable to athermalize, such as, for example a fiber Bragg grating region. The optical device region 190 of the optical fiber device 172 is contained within the cavity 192 of the temperature-compensating package 174. The temperature-compensating package 174 includes a first axisymmetric member 194, a second axisymmetric member 196, a third axisymmetric member 198, a first strain relief member 200 and a second strain relief member 202.

The first axisymmetric member 194 includes an end 204 having a reference surface 206, a hole 208 passes through the reference surface 206. The intersection of the hole 208 and the reference surface 206 should result in a sharp edge 209. The sharp edge 209 prevents adhesive flowing into the hole 208 by capillary action from flowing along the optical fiber device 172 into the cavity 192. The hole 208 is sized to allow the optical fiber device 172 to pass through and to have walls 210 to which the optical fiber device 172 may be coupled to, such as, for example by adhesive bonding. The first axisymmetric member 194 also includes a reference surface 212 at a distance $k_1$ from the reference surface 206. Preferably, the two reference surfaces 206, 212 are perpendicular to the longitudinal axis of the first axisymmetric member 194. The first axisymmetric member 194 is preferably made of a material having a low coefficient of thermal expansion, such as, for example Invar®, Kovar® or Alloy 42, which are commercially available from specialty metal suppliers. The first axisymmetric member 194 may be made by made by a number of manufacturing processes, such as, for example, machining or precision stamping. The distance $k_1$ between the two reference surfaces 206, 212 corresponds to $l_1$ in equation 1.

The second axisymmetric member 196 also includes two reference surfaces 214, 216 located some distance apart from one another. Preferably, the two reference surfaces 214, 216 are perpendicular to the longitudinal axis of the second axisymmetric member 196. One of the reference surfaces 214 is configured to engage reference surface 212 of the first axisymmetric member 194. The second axisymmetric member 196 is coupled to the first axisymmetric member 194 at the interface of the two reference surfaces 212, 214. The second axisymmetric member 196 may be coupled to the first axisymmetric member 194 for example by adhesive bonding, brazing, soldering or welding. The distance $k_2$ between the two reference surfaces 214, 216 corresponds to $l_2$ in equation 1. The second axisymmetric member 196 is made from a material, such as, for example stainless steel, having a coefficient of thermal expansion greater than that of the first axisymmetric member 194. The second axisymmetric member 196 may be made by made by a number of manufacturing processes, such as, for example, machining or progressive stamping.

The third axisymmetric member 198 also includes two reference surfaces 218, 220. Preferably, the two reference surfaces 218, 220 are perpendicular to the longitudinal axis of the third axisymmetric member 198. One reference surface 218 is configured to engage a reference surface 216 of the second axisymmetric member 196. The third axisymmetric member 198 is coupled to the second axisymmetric member 196 at the interface of the two reference surfaces 216, 218. The third axisymmetric member 198 may be coupled to the second axisymmetric member 196 for example, by adhesive bonding, brazing, soldering or welding. Preferably, the coupling of the third axisymmetric member 198 to the second axisymmetric member 196 does not result in a complete seal at the interface of the two reference surfaces 216, 218. The lack of a complete seal at the interface of the two reference surfaces 216, 218 prevents the build up of pressure inside the temperature-compensating package 174 in response to variations in temperature. The distance $k_3$ between the two reference surfaces 218, 220 corresponds to $l_3$ in equation 1. The third axisymmetric member 198 is made from a material having a lower coefficient of thermal expansion than the second axisymmetric member 196. Preferably made of a material having a low coefficient of thermal expansion, such as, for example Invar®, Kovar® or Alloy 42, which are commercially available from specialty metal suppliers. . The third axisymmetric member 198 may be made by made by a number of manufacturing processes, such as, for example, machining or precision stamping. Preferably, the coefficient of thermal expansion of the third axisymmetric member 198 is equal to the coefficient of thermal expansion of the first axisymmetric member 194.

The reference surface 220 is intersected by a hole 222. Preferably, the hole 222 is coincident with the longitudinal axis of the third axisymmetric member 198. Preferably, the hole 222 and the hole 208 are substantially aligned with one another and are sized so that an optical fiber, such as, for example the optical fiber device 172, may pass in a straight line between the two holes 208, 222 and be coupled to the respective walls 210, 226 of the two holes 208, 222.

For a typical optical fiber device 172, such as, for example, a fiber Bragg grating written in SMF-28™ optical waveguide fiber, available from Corning Incorporated of Corning N.Y., the two holes 208, 222 will have a diameter of about 0.011 inch. The optical fiber device 172 may be coupled to the walls 210, 226 by using an epoxy, such as, for example EP 62-1 available from Master Bond, Inc. of Hackensack, N.J., U.S.A.

The intersection of the hole 222 and the reference surface 220 should result in a sharp edge 228. The sharp edge 228 prevents adhesive flowing into the hole 226 by capillary action from flowing along the optical fiber device 172 into the cavity 192.

Figure 12:
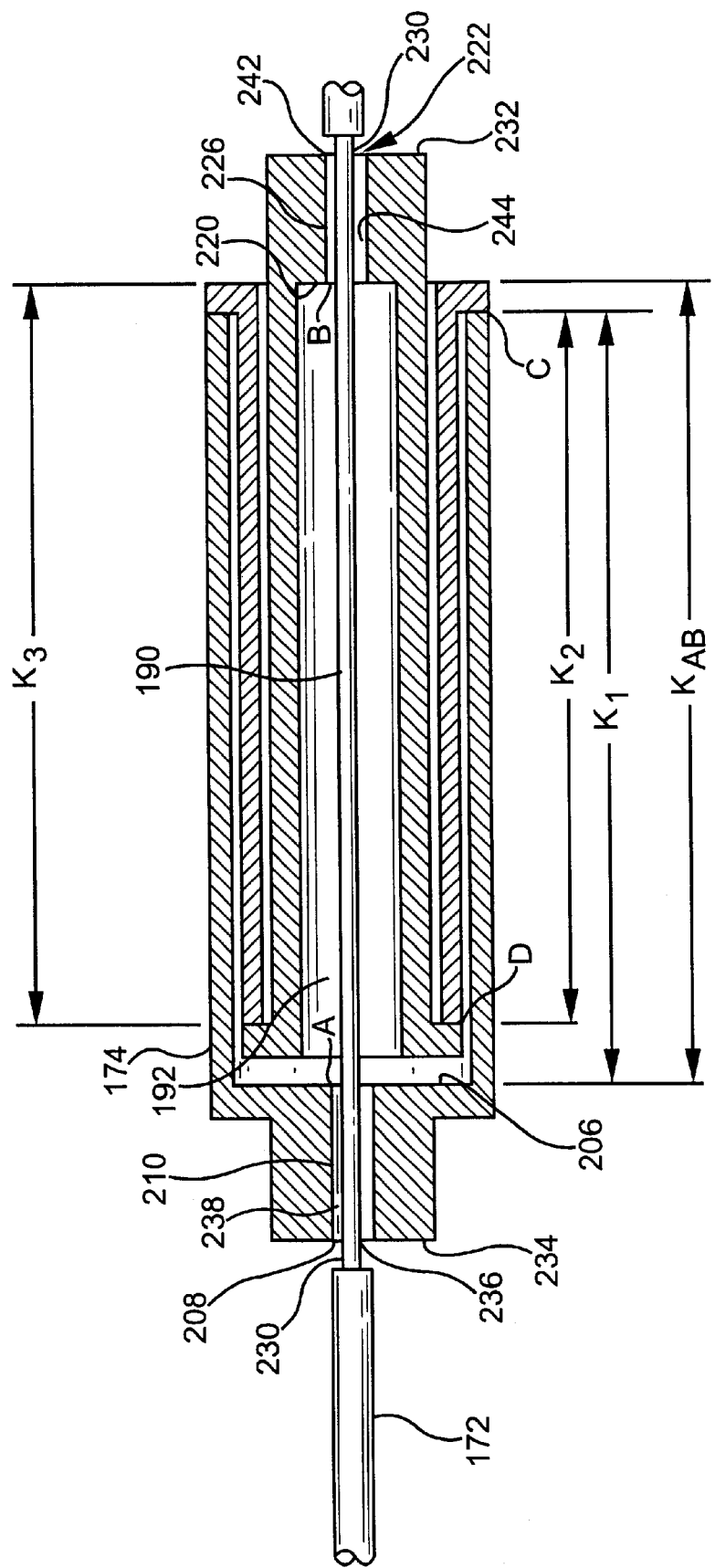
FIG. 12 is a cross-sectional view of a temperature-compensated optical device according to an alternative embodiment of the present invention.

The optical fiber device 172 is coupled to the temperature-compensating package 174 by first threading the optical fiber device 172 through the two holes 208, 222 of the temperature-compensating package 174. Reference will now be made to FIG. 12, a cross-sectional view of the temperature-compensating package 174 into which the optical fiber device 172 has been inserted, in describing the coupling of the optical fiber device 172 to the temperature compensating package 174. The optical fiber device 172 includes a stripped region 230 from which the protective coating, typically a polymeric coating, has been removed. The optical device region 190 is contained within the stripped region 230 of the optical fiber device 172. The stripped region 230 extends about 0.5 mm beyond each end 232, 234 of the temperature-compensating package 174. The optical device region 190 of the optical fiber device 172 containing the optical element, such as, for example a fiber Bragg grating, that it is desired to athermalize is preferably centered in the cavity 192 between the two reference surfaces 206, 220. The optical fiber device 172 is then tensioned. As will be appreciated by those skilled in the art, the amount of tensioning depends on the optical element contained in the optical device region 190 of the optical fiber device 172. For example, when the optical device region 190 contains a fiber Bragg grating the tension of the optical device region 190 is selected so that the fiber Bragg grating has certain optical properties, such as, for example, a certain center wavelength.

The temperature-compensating package 174 with the optical fiber device 172 positioned within it is then isothermally heated to between about 115° C. and 135° C., preferably to about 130° C. An adhesive, such as, for example EP 62-1 available from Master Bond, Inc. of Hackensack, N.J., U.S.A. is placed at the opening 236 around the optical fiber device 172 where it exits the end 234 of the temperature-compensating package 174. The adhesive is drawn into the space 238 between the stripped portion 230 of the optical fiber device 172 and the walls 210 of the hole 208 by capillary action. The flow of adhesive stops when it reaches the reference surface 206 provided there is enough adhesive to fill the entire space 238 between the stripped portion 230 of the optical fiber device 172 and the walls 210 of the hole 208. When the hole 208 is a circular hole the space 238 becomes an annulus. The adhesive is then cured, for a thermal setting adhesive, such as, for example EP 62-1 the cure time of the adhesive is in the range from about 1 minute to about 5 minutes. As will be appreciated by those skilled in the art of using adhesives however, cure times vary with the specific adhesive.

After the adhesive has cured, the stripped region 230 of the optical fiber device 172 extending beyond the end 234 is coated with a small amount of adhesive in order to provide some strain relief.

Similarly, adhesive is placed at the opening 242 around the optical fiber device 172 where it exits the other end 232 of the temperature-compensating package 174. The adhesive is drawn into the space 244 between the stripped portion 230 of the optical fiber device 172 and the walls 226 of the hole 222 by capillary action. Provided there is enough adhesive to fill the space 244 between the walls 226 of the hole 222 and the stripped portion 230 of the optical fiber device 172, the adhesive will stop flowing when it reached the reference surface 220. When the hole 222 is circular the space 244 is an annulus. The adhesive is then cured. After the adhesive has cured, the stripped region 230 of the optical fiber device 172 extending beyond the end 232 is coated with a small amount of adhesive in order to provide some strain relief. The assembly of the optical fiber device 172 and the temperature-compensating package 174 are then allowed to cool to the ambient temperature.

The tension in the optical fiber device 172, the temperature at which the optical fiber device was coupled to the temperature-compensating package 174 and the thermal response of the optical fiber device 172 are all factors that determine the optical properties of the optical device region 190 of the optical fiber device 172. For example, if the optical device region 190 of the optical fiber device 172 is a Bragg grating then the center wavelength of the Bragg grating will depend upon , the temperature at which the optical fiber device was coupled to the temperature-compensating package 174 and the thermal response of the optical fiber device 172.

Returning to FIG. 9, after the optical fiber device 172 is coupled to the thermal-compensating package 174 strain relief boots 200, 202 may be fitted to the optical fiber device 172 where it exits the temperature-compensating package 174. The strain relief boots prevent the formation of a severe stress concentration where the optical fiber device 172 exits the ends 232, 234 of the thermal-compensating package 174 thereby contributing to a more robust package. The strain relief boots may take the form of additional adhesive formed into a substantially conical shape, may be formed of an elastomeric material or any other suitable material known to those skilled in the art of packaging optical fiber devices. As will be appreciated by those skilled in the art of packaging optical fiber devices, the dimensions and material selection of the strain relief boots 200, 202 is a design choice readily made by those skilled in the art.

After the strain relief boots 200, 202 are fitted, the assembled temperature-compensating package 174 and optical fiber device 172 are encapsulated by the over package 176. Typically, the sleeve 178 is positioned so that it is approximately coaxial with the temperature-compensating package 174, and the temperature-compensating package 174 is centered along the length of the sleeve 178. Typically, there will be a difference of from about 0.002 inches to about 0.004 inches between the inner diameter of the sleeve 178 and the outer diameter of the temperature-compensating package 174.

The ends 186, 188 of the over package 176 are then sealed by coupling the end caps 180, 182 to the ends 186, 188 of the sleeve 178. Preferably, the optical fiber device 172 passed through the approximate radial center of each end cap 180, 182 and each end cap 180, 182 is sealed to the optical fiber device 172. The end caps 180, 182 may, for example, be sealed to the optical fiber device using an adhesive that is impermeable to water. Alternatively, it is appreciated that in an alternative embodiment, the end caps 180, 182 may have a groove (not shown) sized to facilitate the passage of the optical fiber device 172 from the cavity 184 to the outside of the over package 176. If a grooved embodiment of the end caps 180, 182 is used the volume of the groove not occupied by the optical fiber device 172 must be sealed, such as, for example, by using an adhesive, to prevent contaminate gases or liquids, such as, for example, water or water vapor, from reaching the optical device region 190.

In one embodiment of the present invention the sleeve 178 and end caps 180, 182 are all made from AISI 304 stainless steel. The sleeve 178 and end caps 180, 182 are threaded onto the assembled temperature-compensating package 174 and optical fiber device 172.

The end caps 180, 182 are coupled to the sleeve 178 by heating the sleeve 178, end caps 180, 182, optical fiber device 172 and the temperature-compensating package 174 to about 130° C. The end caps 180, 182 are inserted into the ends 186, 188 of the sleeve 178. An adhesive, such as, for example, EP 62-1 available from Master Bond, Inc. of Hackensack, N.J., U.S.A. is applied to the interface of the shoulders 982, 984 and the ends 186, 188 of the sleeve 178. The adhesive is drawn into the space between the inside diameter of the sleeve 178 and the end caps 180, 182. Careful selection of the adhesive and the dimensions of the end caps 180, 182 and the sleeve 178 inside diameter will result in a hermetic or near hermetic seal between the end caps 180, 182 and the sleeve 178 when the adhesive has cured.

It will be apparent to those of ordinary skill in the art of forming hermetic or near-hermetic seals that modifications and variations can be made to the means of coupling the end caps 180, 182 to the sleeve 178. For example, the sleeve 178 can be coupled to the end caps 180, 182 brazing, soldering or welding.

The sleeve 178 with the end caps 180, 182 coupled to it is positioned so that the temperature-compensating package 174 is substantially centered within the cavity 184. The optical fiber device is tensioned the same amount used when coupling the temperature-compensating package 174 to the optical fiber device 172. Adhesive, such as, for example EP 62-1 available from Master Bond, Inc. of Hackensack, N.J., U.S.A. is applied to the holes 248, 250 and fills the space between the coated portions 252 of the optical fiber device 172 and the sides of the holes 248, 250 by capillary action thereby forming hermetic or near-hermetic seals. After the adhesive is cured the tension is removed from the optical fiber device 172 and the completed temperature-compensated optical device 170 is allowed to cool to room temperature. If the optical device region 190 contains a fiber Bragg grating the center wavelength of the grating when the completed temperature-compensated optical device 170 is at room temperature is determined by the tension applied to the optical fiber device 172 during the assembly process, the temperature during the assembly process and the thermal response of the complete assembly as it cools.

It will be apparent to those of ordinary skill in the art of packaging optical fiber devices that devices that modifications and variations can be made to the means of coupling the end caps 180, 182 to the optical fiber device 172. For example, the optical fiber device 172 can be coupled to the end caps 180, 182 by metallizing the optical fiber device 172 and soldering it to the end caps 180, 182 or by using glass frits.

The effective coefficient of thermal expansion of the temperature-compensating package 174 may be calculated according to equation 1. The distance $k_{AB}$, which defines the effective length of the temperature-compensating package 174 is the distance between the surfaces 206, 220.

$$\alpha_{eff} = \frac{-\alpha_2 \cdot k_2 - \alpha_1 \cdot k_1 - \alpha_3 \cdot k_3}{k_{AB}} \quad (1)$$

where, $\alpha_{eff}$=effective coefficient of thermal expansion;

$\alpha_1$=coefficient of thermal expansion of the first axisymmetric member 194;

$\alpha_2$=coefficient of thermal expansion of the second axisymmetric member 196; and $\alpha_3$=coefficient of thermal expansion of the third axisymmetric member 198.

In one example, the first axisymmetric member 194 and the third axisymmetric member 198 are made from INVAR® having a coefficient of thermal expansion of $15 \times 10^{-7}$ per ° C. over the temperature range of interest in optical communication system applications. The second axisymmetric member 196 is made from AISI 304 stainless steel having a coefficient of thermal expansion of $150 \times 10^{-7}$ per ° C. over the temperature range of interest in optical communication system applications. The distances of interest in the example are: $l^{AB}$ is equal to 42 mm, $l_1$ is equal to 35 mm, $l_2$ is equal to 28 mm and $l_3$ is equal to 35 mm. This selection of materials and dimensions results in a temperature-compensating package 174 with an effective coefficient of thermal expansion of $-75 \times 10^{-7}$ per ° C.

Figure 13:
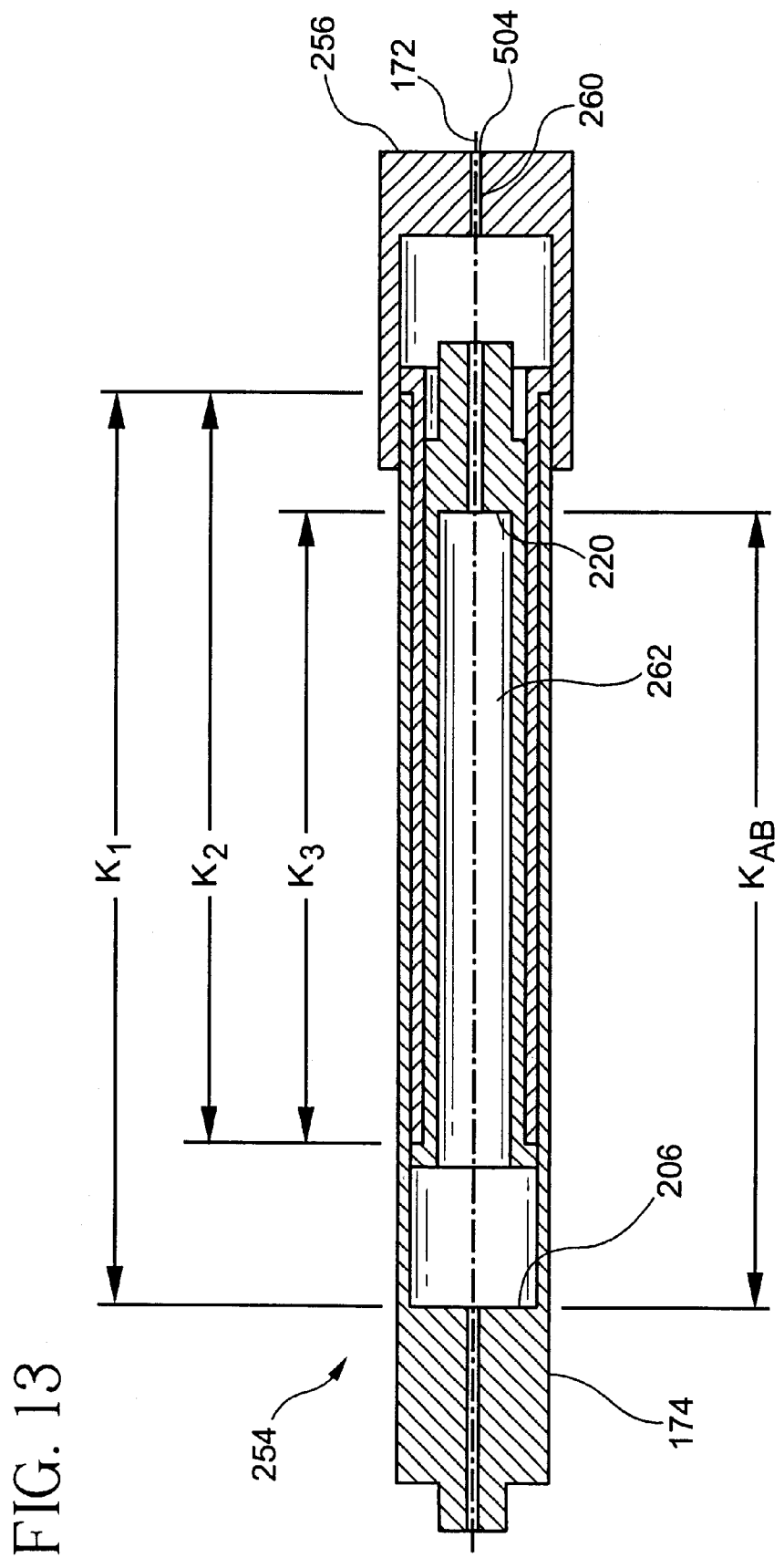
FIG. 13 is a cross-sectional view of a temperature-compensated optical device according to an alternative embodiment of the present invention.

FIG. 13 shows an alternative embodiment in which the temperature-compensated optical device 254 of the present invention includes an optical fiber device 172, a temperature-compensating package 174 and an end cap 256.

The end cap 256 is hermetically coupled to the outside of the temperature-compensating package 174. In the embodiment shown in FIG. 13 the end cap 256 is slidably engageable with the outside of the temperature-compensating package 174. The end cap 256 is hermetically coupled to the outside of the temperature-compensating package 174 using an adhesive, such as, for example EP 62-1 available from Master Bond, Inc. of Hackensack, N.J., U.S.A. It will be apparent to those of ordinary skill in the art of packaging optical fiber devices that modifications and variations can be made to the means of coupling the end cap 256 to the outside of the temperature-compensating package 174 such as, for example, brazing, soldering and welding.

The end cap 256 includes a hole 258. Preferably, the diameter of the hole 258 is about 0.011 inch when the optical fiber device 172 has a diameter of about 125 μm. Preferably, the hole 258 is aligned with the holes 208, 222 in the temperature-compensating package 174. The optical fiber device 172 is coupled to the sides 260 of the hole 258, forming a hermetic seal. The hole 260 is from about 1 mm to about 3 mm in length. The optical fiber device 172 may be coupled to the sides 260 of the hole 258 using an adhesive, such as, for example EP 62-1 available from Master Bond, Inc. of Hackensack, N.J., U.S.A. It will be apparent to those of ordinary skill in the art of packaging optical fiber devices that modifications and variations can be made to the means of coupling the optical fiber device 172 is coupled to the sides 260 of the hole 258 such as, for example metallizing a region of the optical fiber device 172 and soldering the two together.

Figure 11:
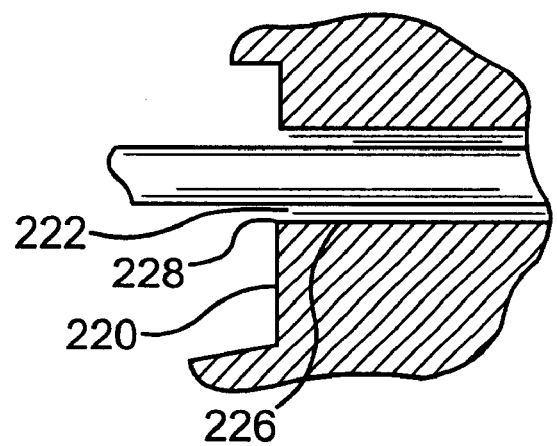
FIG. 11 is an enlarged fragmentary view of the portion of the temperature-compensated optical device within the sight circle 11—11 of FIG. 9.

The hermetic coupling of the end cap 256 to the temperature-compensating package 174 results in a hermetically sealed cavity 262. The optical device region 190 is centered between the two surfaces 206, 220. The effective coefficient of thermal expansion of the temperature-compensating package 174 remains unchanged from that discussed with reference to FIG. 11 and FIG. 12.

What is claimed is:

1. A temperature-compensated device comprising:
   an over-package having a cavity;
   a temperature-compensating package disposed within said cavity; and
   an optical fiber device coupled to said temperature-compensating package in two space apart locations;
   wherein said temperature-compensating package comprises:
     a first axisymmetric member having a first coefficient of thermal expansion;
     a second axisymmetric member coupled to said first axisymmetric member, said second axisymmetric member having a second coefficient of thermal expansion; and
     a third axisymmetric member coupled to said second axisymmetric member, said third axisymmetric member having a third coefficient of thermal expansion;
     wherein said first axisymmetric member, said second axisymmetric member and said third axisymmetric member define a second cavity having a first end and a second end;
     wherein a portion of said optical fiber device is disposed within said second cavity;
     wherein the optical fiber device is coupled to said first end;
     wherein the optical fiber device is coupled said second end.

2. The temperature-compensated device of claim 1, wherein said over-package comprises:
   a tubular member, said tubular member having two ends; and
   two end caps, each of said end caps coupled to one of said ends;
   wherein said tubular member and said two end caps define said cavity;
   wherein said cavity is substantially a hermetic cavity.

3. The temperature-compensating package of claim 1 wherein said first coefficient of thermal expansion and said third coefficient of thermal expansion are less than said second coefficient of thermal expansion.

4. The temperature-compensating package of claim 3 wherein said first axisymmetric member is welded to said second axisymmetric member; and wherein said second axisymmetric member is welded to said third axisymmetric member.

5. The temperature-compensating package of claim 4 wherein said first axisymmetric member is made from a material selected from the group including ceramics, glass and glass-ceramics.

6. The temperature-compensating package of claim 4 wherein said third axisymmetric member is made from a material selected from the group including ceramics, glass and glass-ceramics.

7. The temperature-compensating package of claim 4 wherein said second axisymmetric member is made from stainless steel.

8. The temperature-compensating package of claim 4 wherein said optical fiber device is coupled to said first end by an adhesive and wherein said optical fiber device is coupled to said second end by said adhesive.

9. The temperature-compensating package of claim 8 wherein said optical fiber device includes a Bragg grating.

10. A method for forming an optical waveguide device comprising the steps of:
    providing a first tubular member having an inner wall and defining a first cavity, said first cavity having a first predetermined diameter;
    providing a second tubular member having an inner wall defining a second cavity, said second cavity having a second predetermined diameter, wherein said second tubular member is slidably engageable with said first cavity;
    inserting said second tubular member into said first cavity;
    coupling said first tubular member to said second tubular member;
    providing a third tubular member having an inner wall defining a third cavity, said third cavity having a third predetermined diameter, wherein said third tubular member is slidably engageable with said second cavity;
    inserting said third tubular member into said second cavity;
    coupling said second tubular member (14) to said third tubular member;
    providing an optical waveguide fiber of a second predetermined diameter, wherein said second predetermined diameter is less than said third predetermined diameter;
    inserting said optical waveguide fiber into said third cavity;
    coupling said optical waveguide fiber to said first tube; and
    coupling said optical waveguide fiber to said third tube.

11. The method of claim 10 further comprising the step of tensioning the optical waveguide fiber performed after the step of inserting said optical waveguide fiber into said third cavity and prior to the steps of coupling said optical waveguide fiber to said first tube and said second tube.

12. The method of claim 10 wherein the step of coupling said first tube to said second tube comprises welding said first tube to said second tube.

13. The method of claim 10 wherein the step of coupling said second tube to said third tube comprises welding said first tube to said second tube.

14. A thermally compensated fiber Bragg grating made according the method of claim 10.

* * * * *